(12) United States Patent
Krausz et al.

(10) Patent No.: US 7,474,457 B2
(45) Date of Patent: Jan. 6, 2009

(54) GENERATION OF RADIATION WITH STABILIZED FREQUENCY

(75) Inventors: Ferenc Krausz, Garching (DE); Takao Fuji, Garching (DE)

(73) Assignee: Femtolasers Produktions GmbH (AT)

( * ) Notice: Subject to any disclaimer, the term of this patent is extended or adjusted under 35 U.S.C. 154(b) by 11 days.

(21) Appl. No.: 11/572,312

(22) PCT Filed: Jul. 19, 2005

(86) PCT No.: PCT/EP2005/007850

§ 371 (c)(1),
(2), (4) Date: Jan. 18, 2007

(87) PCT Pub. No.: WO2006/008135

PCT Pub. Date: Jan. 26, 2006

(65) Prior Publication Data

US 2008/0049301 A1    Feb. 28, 2008

(30) Foreign Application Priority Data

Jul. 21, 2004    (AT) .................................. 1242/2004

(51) Int. Cl.
*G02F 1/35* (2006.01)
*G02F 2/02* (2006.01)
(52) U.S. Cl. ..................... 359/326; 385/122; 372/22
(58) Field of Classification Search ......... 359/326–332; 385/122; 372/21, 22
See application file for complete search history.

(56) References Cited

U.S. PATENT DOCUMENTS 6,034,976 A * 3/2000 Mossberg et al. ............. 372/32
6,724,788 B1 * 4/2004 Holzwarth et al. ........... 372/32

OTHER PUBLICATIONS

Fuji T Etal: "Self-stabilization of carrier-envelope offset phase by use of difference-frequency generation" Optics Letter Opt. Soc. Americas USA, vol. 29, No. 6, Mar. 15, 2004, pp. 632-634, XP002356037 ISSN: 0146-9592.
Zimmermann m Et al.: "Optical cloackwork with an offset-free difference frequency comb: accuracy of sum-and difference-frequency generation" Optical Letters, OSA, Optical Society of America, Washington, D.C. US vol. 29, No. 3, Feb. 1, 2004, pp. 310-312, XP002336000 ISSN: 0146-9592.
Takao Fuji et al: "attosecond control of optical waveforms" New Journal of physics deutsche physikalische gesellschaft & iop publishing ltd UK, vol. 7, No. 1, January ISSN: 1367-2630.

(Continued)

*Primary Examiner*—Sung H Pak
*Assistant Examiner*—Daniel Petkovsek
(74) *Attorney, Agent, or Firm*—Ostrolenk, Faber, Gerb & Soffen, LLP

(57) ABSTRACT

Method and device for the generation of a comb of stabilized frequency lines and/or a train of ultrashort laser pulses for stabilization of the position of the carrier wave with respect to the amplitude envelope of few cycles laser pulses. Interference between spectral components generated by means of difference frequency generation and self phase modulation in one and the same non-linear crystal (4) allows detecting and stabilizing the temporal evolution of the carrier-envelope offset (CEO) phase. The described technique improves dramatically the accuracy of the stabilization and has very small insertion losses.

20 Claims, 4 Drawing Sheets

OTHER PUBLICATIONS

Tritschler T et al: "Role of the carrier-envelope phase in extreme nonlinear optics in ZnO" Proceedings of the SPIE—The International Society for Optical Engineering SPIE—Int. Soc. Opt. Eng USA, vol. 4992, 2003, pp. 33-42, XP002356181 ISSN: 0277-786X.
International Search Report PCT/EP2005/007850 dated Dec. 2, 2005.

Fuji T et al: "Self-stabilization of carrier-envelope offset phase by use of difference-frequency generation" Optics Letters Opt. Soc. Americas USA, vol. 29, No. 6, Mar. 15, 2004, pp. 632-634, XP002356037 ISSN: 0146-9592.

* cited by examiner time domain frequency domain

GENERATION OF RADIATION WITH STABILIZED FREQUENCY

CROSS REFERENCE TO RELATED APPLICATIONS

The present application is a 35 U.S.C. 371 national phase conversion of PCT/EP2005/007850 filed Jul. 19, 2005, which claims priority of Austrian Application No. A1242/2004 filed Jul. 21, 2004, which are herein incorporated by reference. The PCT International Application was published in the English language.

BACKGROUND OF THE INVENTION

The invention generally relates to femtosecond laser development, frequency metrology, and more in detail to carrier-envelope phase stabilization of femtosecond laser oscillator.

In particular, the invention concerns a method and a device for the generation of radiation with stabilized frequency, namely of a comb of stabilized frequency lines and/or of a train of ultrashort laser pulses with controlled temporal evolution of the carrier-envelope offset phase.

DESCRIPTION OF THE RELATED ART

U.S. Pat. No. 6,724,788 B1 discloses a method and device for generating radiation with stabilized frequency, where laser light pulses with a repetition frequency $f_r$ are generated, said pulses comprising a plurality of n frequency components $f_n$, with $f_n = n \cdot f_r + f_0$, wherein $f_0$ represents an offset frequency, and n=1, ..., N. Said frequency components form a comb with first and second different frequency portions. A primary light output is generated with a non-linear optical medium, where at least one output frequency component corresponds to the difference of frequencies of said first and second frequency portions. However, for phase matching, a separate, relatively complicated interferometer-type unit is used.

Dramatic advances in generating and controlling ultrashort-pulsed optical radiation took place during the last years. The quest for ever shorter laser pulses led to pulse durations as short as approximately twice the oscillation period of the carrier field ($T_0 \sim 2.6$ fs at $\lambda_0 = 0.8$ µm, the center wavelength of a titanium-doped sapphire laser), approaching the limit set by the laser cycle, s. Ref. [1, 2, 3, 4]. This limit can be overcome by converting the optical pulses into higher-frequency radiation by means of high order harmonic generation (HHG). This process, if driven by few-cycle pulses, s. Ref. [5, 6], is capable of delivering x-ray pulses shorter than the oscillation period of the driving laser, s. Ref. [7] and even shorter than 1 fs in duration, s. Ref. [8]. The parameters of the attosecond pulses emerging from this process sensitively depend on how the oscillations of the electric field $E(t)=A(t) \exp[-i(\omega_0 t + \Phi)]+c.c.$ fit within the amplitude envelope, s. Ref. [9, 10, 11, 12]. This is determined by the phase angle $\Phi$, which has been referred to as carrier-envelope offset (CEO) phase of light pulses, s. Ref. [13].

Thus, it is an object of the present invention to provide measurement and stabilization of this carrier-envelope offset. Stabilization of the CEO phase is of vital importance not only to strong-field experiments with few-cycle pulses (e.g. HHG) but also to frequency-domain metrology, s. Ref. [14].

Since few-cycle pulses are typically generated from mode-locked laser resonators, the light pulses are emitted as a periodic pulse train with a pulse to pulse delay time T, i.e. with a repetition frequency $$f_r = \frac{1}{T}.$$

The carrier-envelope phase $\Phi$ of consecutive pulses in such a train $E_n = A_n(t) \exp[-i(\omega_0 t + \Phi_n)]+c.c.$ (where $\omega_0$ is the carrier angular frequency, $E_n$ the field strength of the n-th pulse and $A_n$ the field envelope of the n-th pulse) emitted from a mode-locked laser is expected to change by $\Delta \Phi_n = (\Phi_{n+1}) - \Phi_n = \Delta \Phi_0 + \delta_n$. The predictable part $\Delta \Phi_0$ of this phase change originates from the difference between the effective group velocity $v_g$ and the phase velocity $v_p$ at the carrier frequency in the laser cavity and represents the mean value of $\Delta \Phi n$ averaged over many pulses, $\Delta \Phi_0 = \langle \Delta \Phi_n \rangle$. The carrier-envelope phase-shift experienced by a pulse upon propagation through a transparent material of length L and refractive index $n(\omega)$ can be expressed as $$\Delta \Phi_0 = \pi \cdot \frac{L}{L_d}$$

where $L_d$ is the propagation length over which $\Phi$ gets shifted by $\pi$, i.e., $$L_d = \frac{1}{\pi} \left( \frac{\omega_0^2}{c} \frac{\partial n(\omega)}{\partial \omega} \bigg|_{\omega_0} \right)^{-1} \quad (1)$$

This dephasing length is $L_d \sim 20$ cm in air, and $\sim 19$ µm in sapphire, respectively. Comparing these values with those of the propagation lengths in the respective media in a Ti:sapphire oscillator, it may be concluded that the carrier-envelope dephasing experienced by a laser pulse during a resonator round-trip amounts to a large integer multiple of $2\pi$ plus a rational fraction of $2\pi$. This physically relevant part is denoted with $\Delta \Phi_n$, and is referred to as pulse-to-pulse or round-trip carrier-envelope offset phase shift. The length of the laser cavity can, in principle, be tuned so as the round-trip phase change would be equal to an integer multiple of $2\pi$, and all the pulses in the emitted train would have a constant absolute phase, affected only by small random changes $\delta_n$. However, even small values of $\delta_n$ rapidly accumulate to a large ($>>2\pi$) jitter of $\Phi$ in very short intervals of time, since the repetition frequency is very high (typically tens of MHz). It is thus imperative to measure and stabilize $\Phi_n$, i.e. to measure and stabilize the temporal evolution of the CEO phase.

The spectrum of a train of mode-locked pulses consists of spectral lines $f_n$ separated by the repetition frequency $f_r$, such that $f_{n+1} - f_n = f_r$ (see also FIG. 1B). It has been shown, s. Ref. [15], that the frequency lines $f_n$ are not integer multiples of the repetition frequency $f_r$, and they can be expressed as: $f_n = n \cdot f_r + f_{CEO}$, where $f_{CEO} = f_r \Delta \Phi / (2\pi)$ is the frequency at which the CEO phase reproduces itself, called CEO frequency. Stabilization of the CEO phase requires thus the measurement and stabilization of the CEO frequency $f_{CEO}$.

The repetition frequency $f_r$ can be directly accessed by measuring the laser output with a photodiode and filtering its signal with a low-pass filter suppressing frequencies above $f_r$. As the CEO frequency $f_{CEO}$ does not represent a directly measurable frequency, but a frequency-shift, its determination is not trivial. Access to the CEO frequency $F_{CEO}$ can be gained by heterodyning modes obtained from the laser comb via nonlinear frequency conversion processes of different order. A frequency closed to a given mode $f_k=kf_r$ can be generated either from the mode $f_n$ via a qth-order nonlinear process, or from the mode $f_m$ via a pth-order non-linear process (k, m and n are large integers, such that nq=mp):

$$f_{qn}=qf_n=qnf_r+qf_{CEO} \quad (2)$$

$$f_{pm}=pf_m=pmf_r+pf_{CEO} \quad (3)$$

Heterodyning $f_{qn}$ with $f_{pm}$ will give rise to a beat note at:

$$\Delta f=qnf_r+qf_{CEO}-pmf_r-pf_{CEO}=(q-p)f_{CEO} \quad (4)$$

If the frequency comb is narrow, the realization of two different nonlinear frequency conversion paths leading to the same spectral line might call for the use of one or more additional phase-locked transfer oscillators, s. Ref. [15]. However, the advent of photonic crystal fibers (PCFs) allows extra-cavity broadening to more than one optical octave, s. Ref. [16, 14], just as specially-designed oscillators with more than 1 MW peak power did in conjunction with standard single-mode fibers, s. Ref. [17]. These advances opened the way towards the simplest possible implementation of the above concept, namely with p=1 and q=2 in the above terminology. Measuring the CEO frequency $f_{CEO}$ in this case relies on the heterodyne detection of the short-wavelength modes of the comb with the frequency-doubled long-wavelength modes, which can be accomplished if the frequency comb spans a full optical octave. This method has been referred to as the "f to 2f" technique. The CEO-measured CEO frequency $f_{CEO}$ may be compared to a stabilized radiofrequency and locked to it by means of a feedback loop that controls the round-trip CEO phase via the resonator dispersion or via the intra-cavity energy.

The technical drawbacks of the f to 2f stabilization technique are its cumbersome complexity and the invasive nature of the stabilization. So far, the pulses passing through the phase-stabilizing device could neither be recompressed nor used for applications. As a consequence, the time evolution of the CEO phase was measured and stabilized not directly at the useful output of the system. Due to this reason, large phase error always appears around 1-10 ms observation time, s. Ref. [18].

Once the CEO frequency $f_{CEO}$ is locked to a reference frequency, the frequency comb corresponding to the train of laser pulses consists of precisely fixed frequency lines with an accurately known and well-controllable spacing. This fixed frequency comb is a valuable tool for frequency-domain metrology. Alternatively to the f to 2f technique, as in the U.S. Pat. No. 6,724,788 B1, it is proposed to generate such a comb of fixed frequencies by performing difference frequency generation between different frequency lines of the laser spectrum. For two frequency components $f_n=n \cdot f_r+f_{CEO}$ (or $f_k=k \cdot f_r+f_0$) and $f_m=m \cdot f_r+f_{CEO}$, (or $f_l=l \cdot f_r+f_0$) the resulting difference frequency $f_m-f_n=(m-n) \cdot f_r$ (or $f_k-f_l=(k-l) \cdot f_r$) does not depend on $f_{CEO}$ and is thus inherently stabilized (m, n or k, l, respectively, being integers). Stabilization of the CEO phase evolution of the laser pulse train would require detecting a beating signal between the fundamental spectrum and the spectrum resulting from difference-frequency generation between the spectral wings, s. Ref. [19, 20]. This can only be achieved with a spectrum extending over more than one optical octave. Since such spectra can not be easily generated directly from a femtosecond laser oscillator, in the above mentioned U.S. Pat. No. 6,724,788 B1 it is proposed to broaden the spectrum in a non-linear element before generating the difference frequency signal. This solution comes along with the drawbacks that characterize f to 2f measurements: the pulses after the non-linear optical medium are incompressible and the full energy of the broadened pulses is required for the measurement of the CEO frequency $f_{CEO}$.

In contrast to this solution, it is now proposed according to the present invention to realize the process of spectral broadening (by means of self phase modulation) and the process of difference frequency generation in the same, comparatively short non-linear optical medium. Given the moderated length of the medium, its group delay dispersion can be compensated. The beating signal at $f_{CEO}$ is detected in a spectral range well separated from the spectrum of the incident pulses. This spectral range can easily be separated from the spectrum of the pulse train that can further be employed for experiments.

It should be mentioned here that it has been previously proposed to detect a beating signal at $f_{CEO}$ by performing second harmonic generation (in contrast to difference frequency generation, as proposed here) and spectral broadening in one and the same non-linear medium, s. Ref. [21]. The choice of difference frequency generation as the non-linear conversion process in the scheme according to the invention is essential, since employing second harmonic generation has the following drawbacks (as shown by Ref. [21]): i) the full broadened output is required for the measurement of $f_{CEO}$, ii) although $f_{CEO}$ is detectable, the beating signal at this frequency is too weak to be stabilized.

SUMMARY OF THE INVENTION

Accordingly, it is an object of the invention to provide a method and a device for generating radiation with stabilized frequency, in particular for generating a comb of stabilized frequency lines and/or a train of ultrashort laser pulses with controlled temporal evolution of the CEO phase, where the drawbacks of the prior art are avoided, and where the intended radiation generation with stabilized frequencies is accomplished in a simple, yet efficient manner.

Further, it is an object of the invention to provide a radiation generation technique where a compression of laser pulses, after having passed the non-linear optical medium, and having been broadened thereby, is rendered possible in an efficient way.

Moreover, as mentioned above, it is an object of the invention to provide a radiation generation techniques where measurement and stabilization of the carrier envelope offset (CEO) is possible.

According to the invention, these objects and further goals are achieved by the subject matter as defined in the attached independent claims. Advantageous, preferred embodiments are defined in the dependent claims.

According to the invention, a very simple, efficient and particularly accurate stabilization is achieved, and only very small insertion losses are caused, as compared with the prior art techniques; further effects and advantages issue from the above and the following explanations.

BRIEF DESCRIPTION OF THE DRAWINGS

The invention will now be described in more detail by way of examples and with reference to the enclosed drawings. In the drawings

DETAILED DESCRIPTION OF THE PREFERRED EMBODIMENTS

Figure 1A:
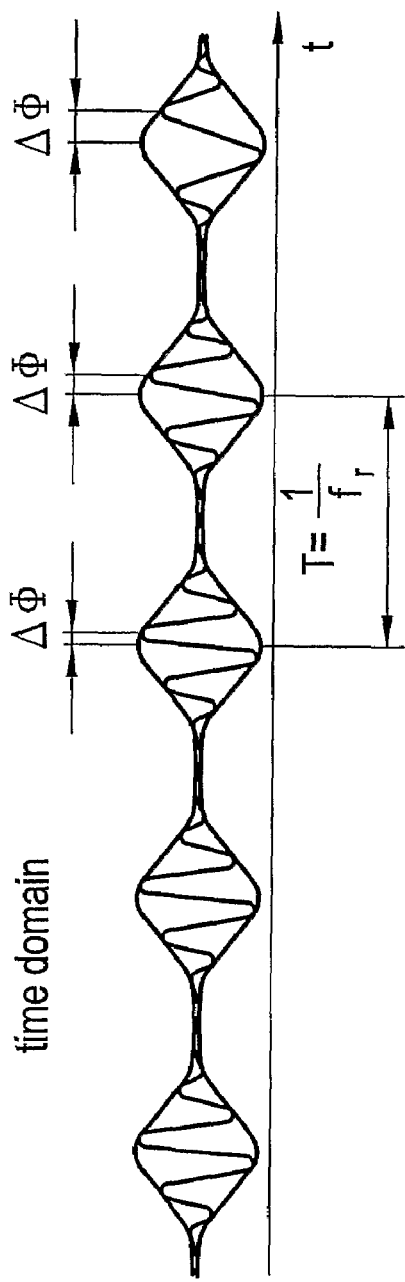
FIGS. 1A and 1B show schematic representations of laser pulses in the time domain (FIG. 1A) and in the frequency domain (FIG. 1B)
Figure 1B:
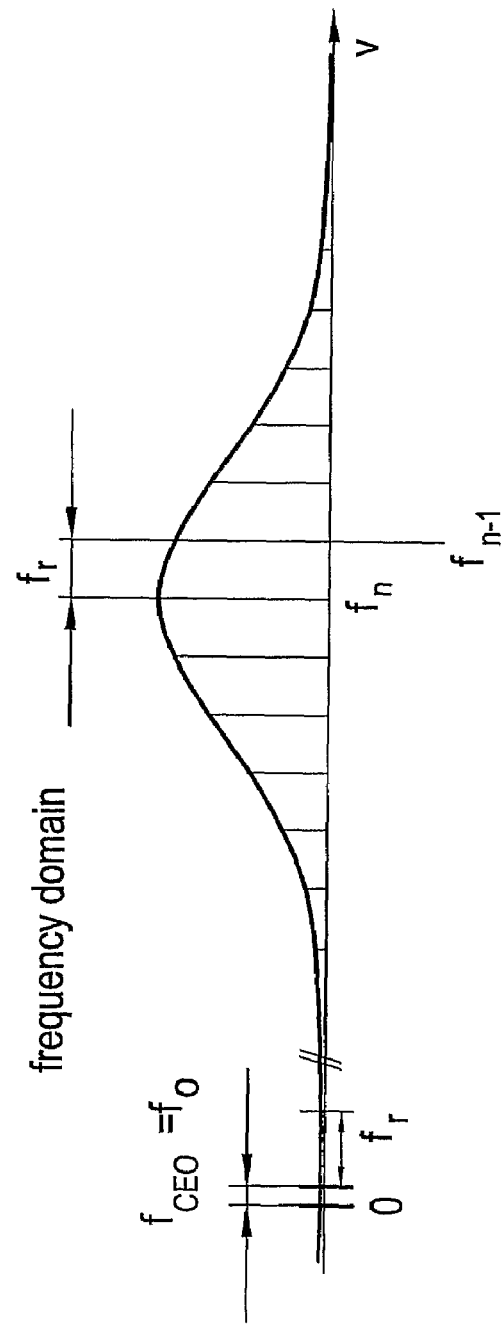

As mentioned above, FIGS. 1A and 1B show a schematic representation of laser light pulses in the time domain (FIG. 1A) and in the frequency domain (FIG. 1B). The spectrum of a train of laser light pulses shown in FIG. 1B consists of spectral lines separated by the repetition frequency $f_r$, such that $f_{n+1} - f_n = f_r$. Furthermore, the frequency $f_{CEO}$ which, may be denoted as offset frequency $f_0$, too, is shown in FIG. 1B, and in FIG. 1A, also the CEO phase shift $\Delta\Phi$ and the period T and its inverse, the repetition frequency $f_r$, are shown.

Figure 2:
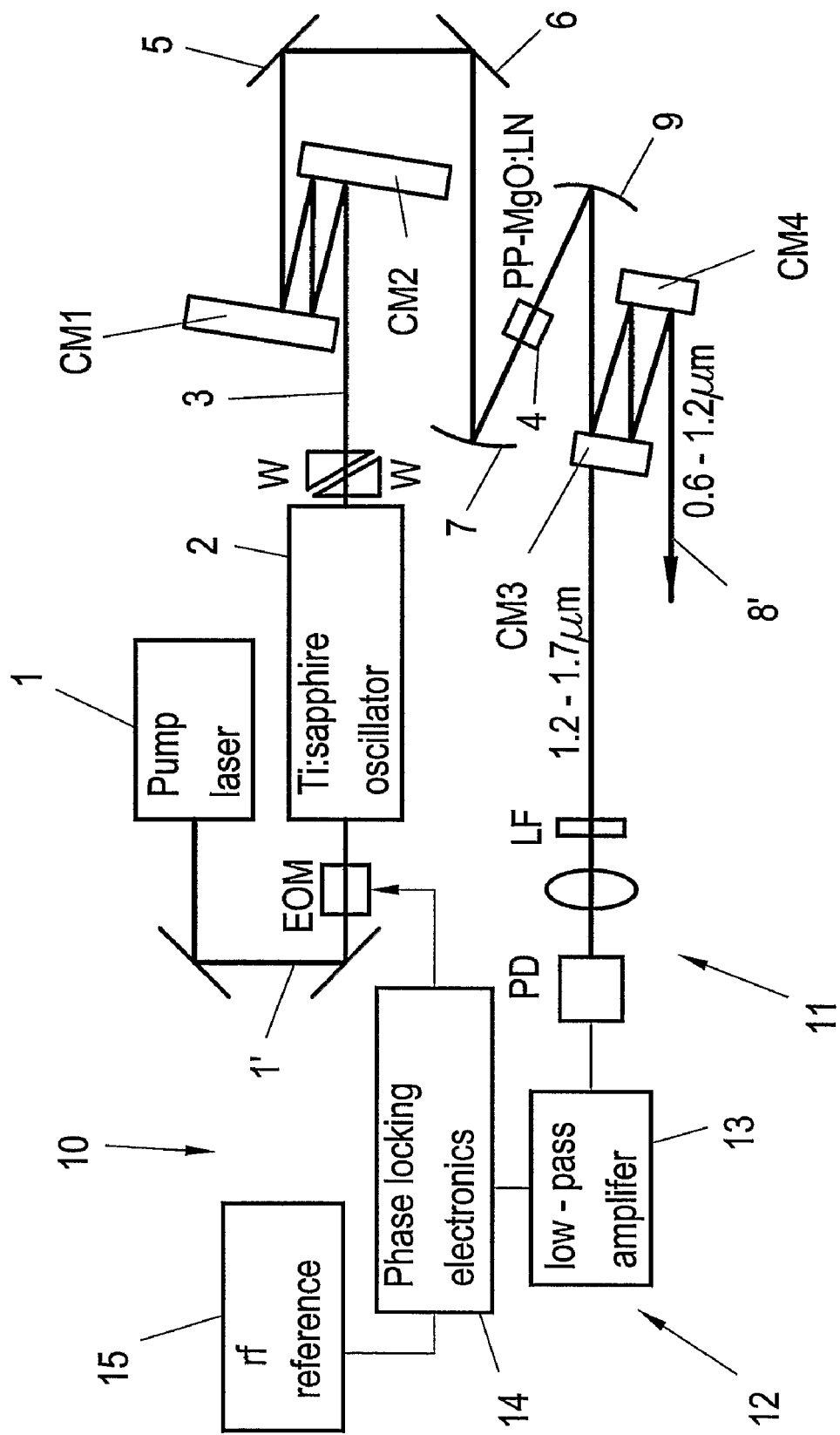
FIG. 2 shows a schematic block diagram of a device according to a preferred embodiment of the invention, and comprising a feedback loop for $f_{CEO}$ stabilization.

FIG. 2 shows a schematic block diagram of a preferred embodiment of the device according to the invention comprising a $f_{CEO}$ stabilization scheme. As to the components of this device, there is a pump laser 1, e.g. a second harmonic of diode pumped Nd:YVO4 laser (for instance the commercially available laser Coherent, Verdi: 532 nm, 3.85 W). The pump laser beam 1' is applied to a Ti:sapphire laser oscillator 2 where a laser light beam 3 is generated in accordance with the well-known mode-locking principle. The laser light beam 3 is then coupled into a non-linear optical medium 4 after passing a pair of fused silica wedged plates W (which may be used to optimize the duration of the pulses carried by the beam 3) and chirped mirrors CM1 and CM2, as well as further mirrors 5, 6 and 7. The chirped mirrors CM1, CM2 provide for a negative group delay dispersion (GDD), as is known per se, whereas the wedged plates W introduce a positive GDD; accordingly, GDD compensation may be achieved by CM1, CM2.

The non-linear optical medium 4 may comprise a periodically poled magnesium oxide-doped lithium niobate (PP—MgO:LN) crystal, as is indicated in FIG. 2, but may alternatively comprise also other optically non-linear periodically poled crystal materials which are capable of quasi-phase matching (QPM), as disclosed e.g. in U.S. Pat. No. 5,787,102 A, and of the difference frequency generation described, compare also Ref. [23]; so, for instance, periodically poled lithium niobate crystals, periodically poled lithium tantalate crystals, or periodically poled potassium niobate crystals may be used, too.

The output of the non-linear medium 4, or crystal 4, respectively, is coupled into a delay line 8 comprising chirped mirrors CM3, CM4 (with multiple reflections) via a concave mirror 9. At the output 8' of the delay line, e.g. 6-fs phase-stabilized pulses are obtained, i.e. a train of laser light pulses, the laser light having a spectrum spanning the wavelength range of 0.6-1.2 µm.

Furthermore, the output light of the non-linear crystal 4 is sent to a detector and stabilizing unit 10 comprising a detector 11 which includes a long pass filter LF having a cutoff wavelength at 1400 nm and a photo diode PD, for instance an In—GaAs photo diode. For stabilizing the frequency, a feedback loop 12 is provided comprising a low-pass amplifier 13, e.g. an electronic amplifier available from Stanford Research System (Model SR560); a phase-locking electronics 14, as e.g. the "lock box" from MenloSystems; and a rf (radio frequency) reference oscillator 15, for instance a signal generator, Marconi, 2022D, which is operated at 1 Mhz.

From FIG. 2, it may further be seen that the—electronic—output put of the "lock box" 14 is applied to an electro-optic modulator EOM, to control the amplitude of the pump laser beam 1', to effect self phase modulation in the oscillator 2, for maintaining the offset frequency $f_0 = f_{CEO}$ constant. (Instead of this type of control, it would also be possible, e.g., to control the power of the pump laser 1, as will be well-known to persons skilled in the art).

The device according to FIG. 2 allows a dramatically better stabilization of the temporal evolution of CEO phase, when compared with the prior art. When the peak intensity of the laser pulse and the nonlinearity of the non-linear frequency mixing crystal, namely the optically non-linear medium 4, are large enough, second-order non-linear frequency mixing (second harmonic generation or difference frequency generation; →$f_d$) as well as self-phase modulation (→$f_{SPM}$) occur at the same time with the aid of the non-linear medium 4. If there is a spectral overlap between these two generated components $f_d$ and $f_{SPM}$, a beat signal (beating frequency), $f_0$ between them should emerge at $f_{CEO}$, that is $f_0 = f_{CEO}$. As mentioned above, a prior art scheme making use of a thin ZnO crystal for spectral broadening and second harmonic generation was demonstrated for observation of a beat signal at $f_{CEO}$, s. Ref. [21]; however, phase stabilization could not be accomplished. In the present case, 6-fs 3-nJ pulses from the Ti:sapphire oscillator 2 are tightly focussed on the non-linear optical medium 4, e.g. in form of a periodically poled magnesium oxide-doped lithium niobate bulk crystal (PP—MgO:LN), which has a higher non-linear conversion efficiency than the ZnO crystal, and both self-phase modulation and difference-frequency generation occur in the crystal 4, and their spectra overlap at about 1400 nm. As a result, a strong interference beat signal is observed at this wavelength of 1400 nm, and stabilization of $f_{CEO}$ of the laser is possible. A most remarkable feature of this phase stabilization technique is that the beat signal is generated outside of the original laser spectrum. This means that the pulses used for phase stabilization can be exploited for further applications. Additionally, all beams are collinear and no delay lines are needed to adjust the two non-linear mixing components $f_d$ and $f_{SPM}$. Thus, in contrast to the prior art f to 2f technique, the present system is insensitive to misalignment, and better phase locking quality can be expected.

Figure 3A:
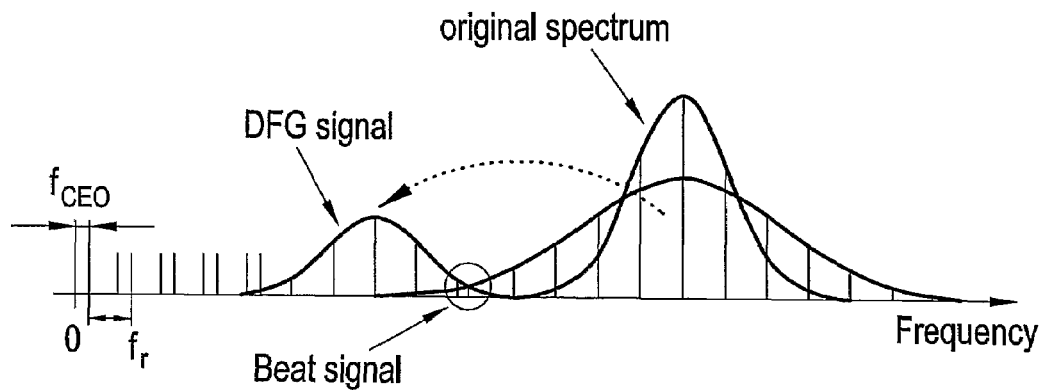
FIG. 3A shows the scheme of observing the carrier-envelope off-set in the frequency domain.

The underlying processes of this scheme are explained in FIG. 3A: The difference frequency $f_d$ between high frequency and low frequency components (e.g. 600 nm and 1050 nm) is generated (by frequency mixing) at 1400 nm. At the same time, self phase modulation inside the crystal 4 also generates light at this wavelength. The carrier-envelope offset frequency $f_{CEO}$ of the difference frequency is always 0, s. Ref. [19, 20], whereas the supercontinuum carries $f_{CEO}$ of the original pulse train. Consequently, one can observe the interference beat signal at 1400 nm. The horizontal arrows in FIG. 3A indicate pairs of frequency lines that are mixed in the process of difference frequency generation ("DFG"), giving rise to the spectrum labeled "DFG" signal". The label "original spectrum" is associated to the spectrum of the pulses focused into the non-linear crystal 4. This spectrum is broadened in the non-linear crystal 4 due to self phase modulation (SPM). In the spectral region in which the DFG signal and the broadened spectrum overlap, a beat signal having the frequency $f_{CEO}$ emerges.

Figure 3B:
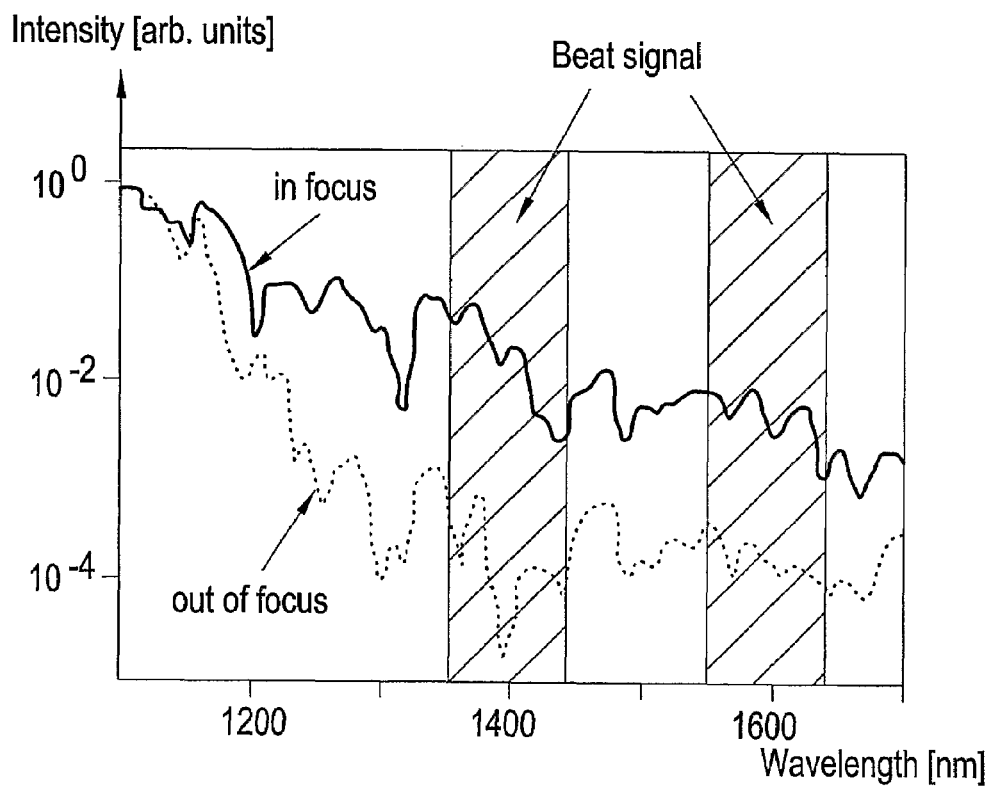
FIG. 3B shows the intensity (in arbitrary units) versus the wavelength of the laser light pulses (in nm) after passing through the non-linear optical medium.

FIG. 3B shows the long wavelength edge spectrum of the pulses after passing through the crystal. The spectrum of FIG. 3B has been measured with an optical spectrum analyser (Ando, AQ-6315A). In FIG. 3B, the solid line shows the spectrum when the beam 3 is focused into the crystal 4, whereas the dotted line shows this spectrum when the beam is not focused into it. Beat signals are observed in the shaded regions. Newly generated spectral components in this region are clearly visible when the pulses are focused more tightly into the crystal 4. This is attributed mainly to the self-phase modulation by the crystal 4 as well as to difference-frequency mixing where phase matching occurs.

Figure 4:
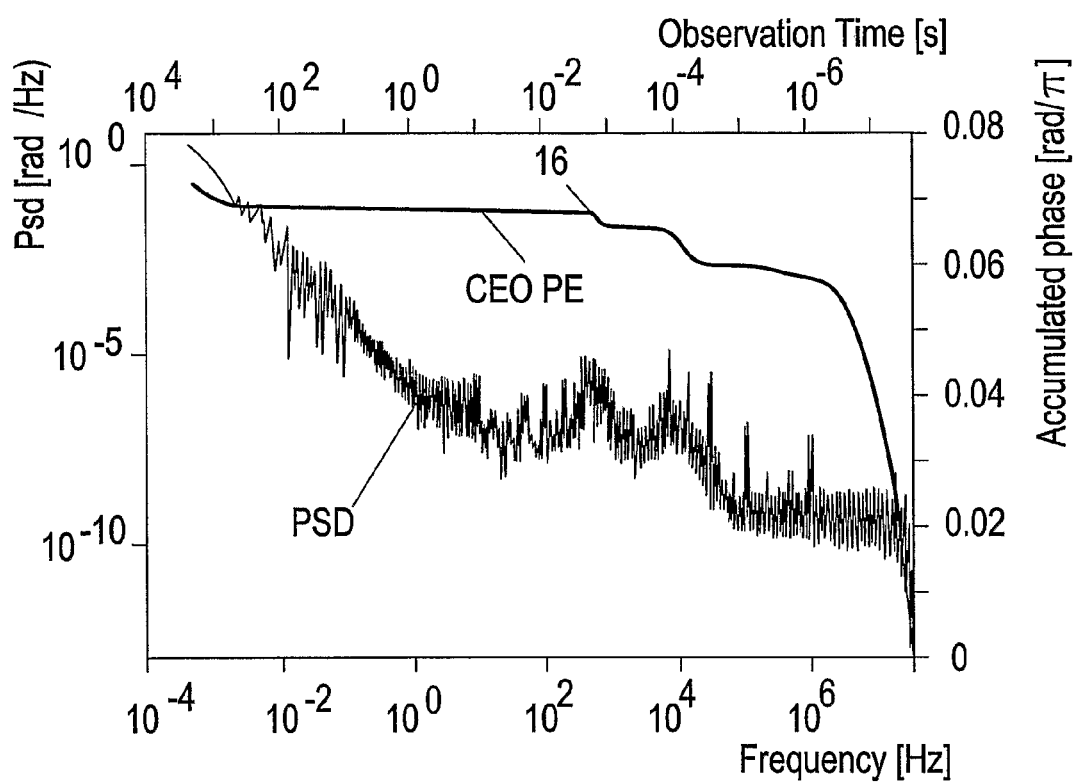
FIG. 4 shows the out-of-loop phase noise power spectral density PSD and the integrated CEO phase error versus the frequency, also as a function of the observation time (frequency$^{-1}$).

FIG. 4 shows the out-of-loop phase noise power spectral density (PSD) and integrated CEO phase error (CEO PE) versus frequency, as a function of observation time (frequency$^{-1}$).

In an experiment, the pulses passing through the non-linear crystal 4 were re-compressed by the delay line 8 down to 6 $f_s$, which is few-cycle pulse, and the measured out of loop phase noise was 0.0427π rad (from 10 μs to 35 minutes observation time), which is approximately five times better than that of the prior art phase stabilization methods, s. Ref. [18, 22]. The large phase error step-like structure around the observation time corresponding to about 200 Hz (indicated by 16 in FIG. 4) is much less pronounced than that of Ref. [18].

REFERENCES

[1] A. Baltuska, Z. Wei, M. S. Pshenichnikov, and D. A. Wiersma. Optical pulse compression to 5 fs at 1-MHz repetition rate. Opt. Lett., 22:102-104, 1997.

[2] Z. Cheng, A. Fiirbach, S. Sartania, M. Lenzner, Ch. Spielmann, and F. Krausz. Amplitude and chirpcharacterization of high-power laser pulses in the 5-fs regime. Opt. Lett., 24:247-249, 1999.

[3] U. Morgner, F. X. Kartner, S. H. Cho, Y. Chen, H. A. Haus, J. G. Fujimoto, E. P. Ippen, V. Scheuer, G. Angelow, and T. Tschudi. Sub-two-cycle pulses from a Kerr-lens mode-locked Ti:sapphire laser. Opt. Lett., 24:411-413, 1999.

[4] D. H. Sutter, G. Steinmeyer, L. Gallmann, N. Matuschek, F. Morier-Genoud, U. Keller, V. Scheuer, G. Angelow, and T. Tschudi. Semiconductor saturable-absorber mirror-assisted Kerr-lens mode-locked Ti:sapphire laser producing pulses in the two-cycle regime. Opt. Lett., 24:631-633, 1999.

[5] Ch. Spielmann, N. H. Burnett, S. Sartania, R. Koppitsch, M. Schniirer, C. Kan, M. Lenzner, P. Wobrauschek, and F. Krausz. Generation of coherent x-rays in the water window using 5-femto-second laser pulses. Science, 278:661-664, 1997.

[6] M. Schniirer, Ch. Spielmann, P. Wobrauschek, C. Streli, N. H. Burnett, C. Kan, K. Ferencz, R. Koppitsch, Z. Cheng, T. Brabec, and F. Krausz. Coherent 0.5-kev x-ray emission from helium driven by a sub-10-fs laser. Phys. Rev. Lett., 80:3236-3239, 1998.

[7] M. Drescher, M. Hentschel, R. Kienberger, G. Tempea, C. Spielmann, G. A. Reider, P. B. Corkum, and F. Krausz. X-ray pulses approaching the attosecond frontier. Science, 291:1923-1927, 2001.

[8] R. Kienberger, M. Hentschel, C. Spielmann, G. A. Reider, N. Milosevic, U. Heinzmann, M. Drescher, and F. Krausz. Sub-femto-second x-ray pulse generation and measurement. Appl. Phys. B, 74:S3-S9, 2002.

[9] A. de Bohan, P. Antoine, D. B. Milosevic, and B. Piraux. Phase-dependent harmonic emission with ultrashort laser pulses. Phys. Rev. Lett., 81:1837-1840, 1998.

[10] G. Tempea, M. Geissler, and T. Brabec. Phase sensitivity of high-order harmonic generation with few-cycle laser pulses. J. Opt. Soc. Am. B, 16:669-673, 1999.

[11] A. Baltuska, Th. Udem, M. Uiberacker, M. Hentschel, E. Goulielmakis, Ch. Gohle, R. Holzwarth, V. S. Yakovlev, A. Scrinzi, T. W. Hansch, and F. Krausz. Attosecond control of electronic processes by intense light fields. Nature, 421:611-615, 2003.

[12] M. Nisoli, G. Sansone, S. Stagira, S. De Silvestri, C. Vozzi, M. Pascolini, L. Poletto, P. Villoresi, and G. Tondello. Effects of carrier-envelope phase differences of few-optical-cycle light pulses in single-shot high-order-harmonic spectra. Phys. Rev. Lett., 91:213905, 2003.

[13] L. Xu, C. Spielmann, A. Poppe, T. Brabec, and F. Krausz. Route to phase control of ultrashort light pulses. Opt. Lett., 21:2008-2010, 1996.

[14] R. Holzwarth, Th. Udem, T. W. Hansch, J. C. Knight, W. J. Wadsworth, and P. St. J. Russel. Optical frequency synthesizer for precision spectroscopy. Phys. Rev. Lett., 85:2264-2267, 2000.

[15] H. R. Telle, G. Steinmeyer, A. E. Dunlop, J. Stenger, D. H. Sutter, and U. Keller. Carrier-envelope offset phase control: A novel concept for absolute optical frequency measurement and ultrashort pulse generation. Appl. Phys. B, 69:327-332, 1999.

[16] D. J. Jones, S. A. Diddams, J. K. Ranka, A. Stentz, R. S. Windeler, J. L. Hall, and S. T. Cundiff. Carrier-envelope phase control of femtosecond mode-locked lasers and direct optical frequency synthesis. Science, 288:635-639, 2000.

[17] A. Apolonski, A. Poppe, G. Tempea, Ch. Spielmann, Th. Udem, R. Holzwarth, T. W. Hansch, and F. Krausz. Controlling the phase evolution of few-cycle light pulses. Phys. Rev. Lett., 85:740-743, 2000.

[18] T. M. Fortier, D. J. Jones, J. Ye, and S. T. Cundiff. Long-term carrier-envelope phase coherence. Opt. Lett., 27:1436-1438, 2002.

[19] M. Zimmermann, C. Gohle, R. Holzwarth, T. Udem, and T. W. Hansch. Optical clockwork with an offset-free difference-frequency comb: accuracy of sum- and difference-frequency generation. Opt. Lett., 29:310-312, 2004.

[20] T. Fuji, A. Apolonski, and F. Krausz. Self-stabilization of carrier-envelope offset phase by use of difference-frequency generation. Opt. Lett., 29:632-634, 2004.

[21] O. D. Miicke, T. Tritschler, M. Wegener, U. Morgner, and F. X. Kartner. Determining the carrier-envelope offset frequency of 5-fs pulses with extreme nonlinear optics in zno. Opt. Lett., 27:2127-2129, 2002.

[22] P. Dombi, A. Apolonski, Ch. Lemell, G. G. Paulus, M. Kakehata, R. Holzwarth, Th. Udem, K. Torizuka, J. Burgdorfer, T. W. Hansch, and F. Krausz. Direct measurement and analysis of the carrier-envelope phase in light pulses approaching the single-cycle regime. New Journal of Physics, 6:39, 2004.

[23] J. A. Armstrong, N. Bloembergen, J. Ducuing, P. S. Pershan, Interactions between Light Waves in a Nonlinear Dielectric. Pyhs. Rev. 127(6): 1918-1939, 1962.

The invention claimed is:

1. A method for generating radiation with a stabilized frequency, wherein laser light pulses are generated with a repetition frequency $f_r$ by means of a mode-locked laser source, said laser light pulses comprising a plurality N of frequency components $f_n$, with $f_n = n \cdot f_r + f_0$, wherein n=1, 2 . . . N, and $f_0$ represents an offset frequency, and the laser light pulses are coupled into a non-linear optical medium, wherein by means of said non-linear optical medium, both difference frequency generation and self phase modulation are performed, such that a difference frequency component $f_d = (k-1) \cdot f_r = f_k - f_1 = (k \cdot f_r + f_0) - (1 \cdot f_r + f_0)$ is generated, wherein k, 1 are integers, with $f_k = k \cdot f_r + f_0$ and $f_1 = 1 \cdot f_r + f_0$, and a self phase modulation frequency component $f_{SPM} = (k-1) \cdot f_r + f_0 = f_d + f_0$ is generated, in that the beating frequency $f_{CEO} = f_0 = f_{SPM} - f_d$ between the frequencies $f_d$ and $f_{SPM}$ obtained by means of said non-linear optical medium is detected, and in that the value of the detected beating frequency $f_{CEO}=f_0$ is stabilized.

2. The method according to claim 1, wherein the beating frequency $f_0$ is stabilized by comparing and locking this beating frequency $f_0$ to the frequency of a reference oscillator by means of a feedback loop that controls the power of a light beam employed to pump said mode-locked laser source.

3. The method according to claim 1, wherein the mode-locked laser source has a titanium doped sapphire crystal as active medium.

4. The method according to claim 1, wherein the non-linear optical medium employed both for difference frequency generation and for self phase modulation is a periodically poled magnesium oxide-doped lithium niobate crystal.

5. The method according to claim 1, wherein the non-linear optical medium employed both for difference frequency generation and for self phase modulation is a periodically poled lithium niobate crystal.

6. The method according to claim 1, wherein the non-linear optical medium employed both for difference frequency generation and for self phase modulation is a periodically poled lithium tantalate crystal.

7. The method according to claim 1, wherein the non-linear optical medium employed both for difference frequency generation and for self phase modulation is a periodically poled potassium niobate crystal.

8. The method according to claim 1, wherein a comb of stabilized frequency lines is generated.

9. The method according to claim 1, wherein a train of ultrashort laser pulses with controlled temporal evolution of the carrier-envelope offset phase is generated, wherein the laser light pulses are compressed after they have traversed the non-linear optical medium by means of a dispersive delay line.

10. The method according to claim 9, wherein a dispersive delay line is used for compressing the laser light pulses, said dispersive delay line comprising dispersive multilayer mirrors.

11. A device for generating radiation with stabilized frequency and comprising a mode locked laser source emitting laser light pulses with a repetition frequency $f_r$ and comprising a plurality N of frequency components $f_n$ with $f_n=n \cdot f_r+f_0$, wherein $n=1, 2 \ldots N$, and f0 represents an offset frequency, and a non-linear optical medium, wherein the non-linear optical medium is arranged to produce difference frequency generation as well as self phase modulation, such that a difference frequency component $f_d=(k-11) \cdot f_r=f_k-f_1=(k \cdot f_r+f_0)-(1 \cdot f_r+f_0)$ is generated and a frequency component $f_{SPM}=(k-1) \cdot f_r+f_0=f_d+f_0$ is generated, and wherein a detector means is arranged to measure the beating frequency $f_{CEO}=f_0=f_{SPM}-f_d$ between the frequencies $f_d$ and $f_{SPM}$ obtained by means of said non-linear optical medium, and by stabilizing means arranged to stabilize the value of the detected beating frequency $f_{CEO}=f_0$.

12. The device according to claim 11, wherein the stabilizing means comprise a reference oscillator and a feedback loop for comparing and locking the beating frequency to the frequency of the reference oscillator and for controlling the power of a light beam employed to pump said mode-locked laser source.

13. The device according to claim 11, wherein the mode-locked laser source comprises a titanium doped sapphire crystal as active medium.

14. The device according to claim 11, wherein the non-linear optical medium employed both for difference frequency generation and for self phase modulation is a periodically poled magnesium oxide-doped lithium niobate crystal.

15. The device according to claim 11, wherein non-linear optical medium employed both for difference frequency generation and for self phase modulation is a periodically poled lithium niobate crystal.

16. The device according to claim 11, wherein the non-linear optical medium employed both for difference frequency generation and for self phase modulation is a periodically poled lithium tantalate crystal.

17. The device according to claim 11, wherein the non-linear optical medium employed both for difference frequency generation and for self phase modulation is a periodically poled potassium niobate crystal.

18. The device according to claim 11, wherein a comb of stabilized frequency lines is generated.

19. The device according to claim 11, wherein a train of ultrashort laser pulses with controlled temporal evolution of the carrier-envelope offset phase is generated, with a dispersive delay line for compressing the laser pulses after they have traversed the non-linear optical medium.

20. The device according to claim 19, wherein the dispersive delay line arranged for compressing the pulses comprises dispersive multilayer mirrors.

* * * * *